C. L. RANDOLPH.
MOTOR CAR LOCKING DEVICE.
APPLICATION FILED MAY 13, 1919.
1,341,281.
Patented May 25, 1920.
2 SHEETS—SHEET 1.
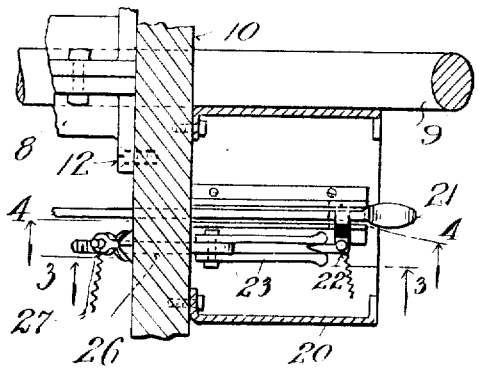
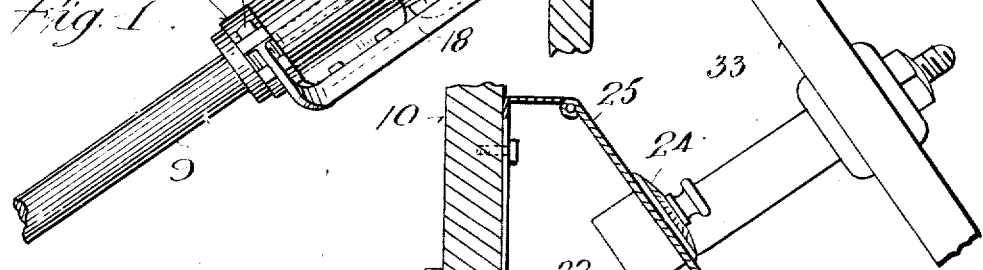
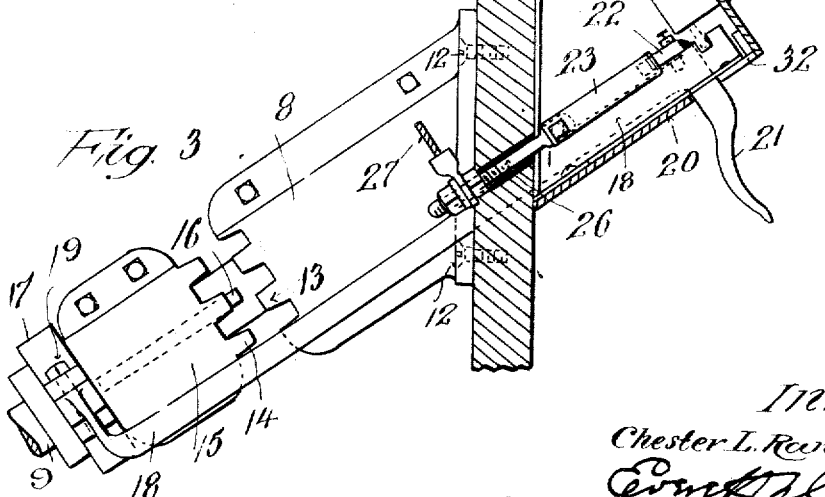
Inventor
Chester L. Randolph,
by his atty C. L. RANDOLPH.
MOTOR CAR LOCKING DEVICE.
APPLICATION FILED MAY 13, 1919.
1,341,281.
Patented May 25, 1920.
2 SHEETS—SHEET 2.
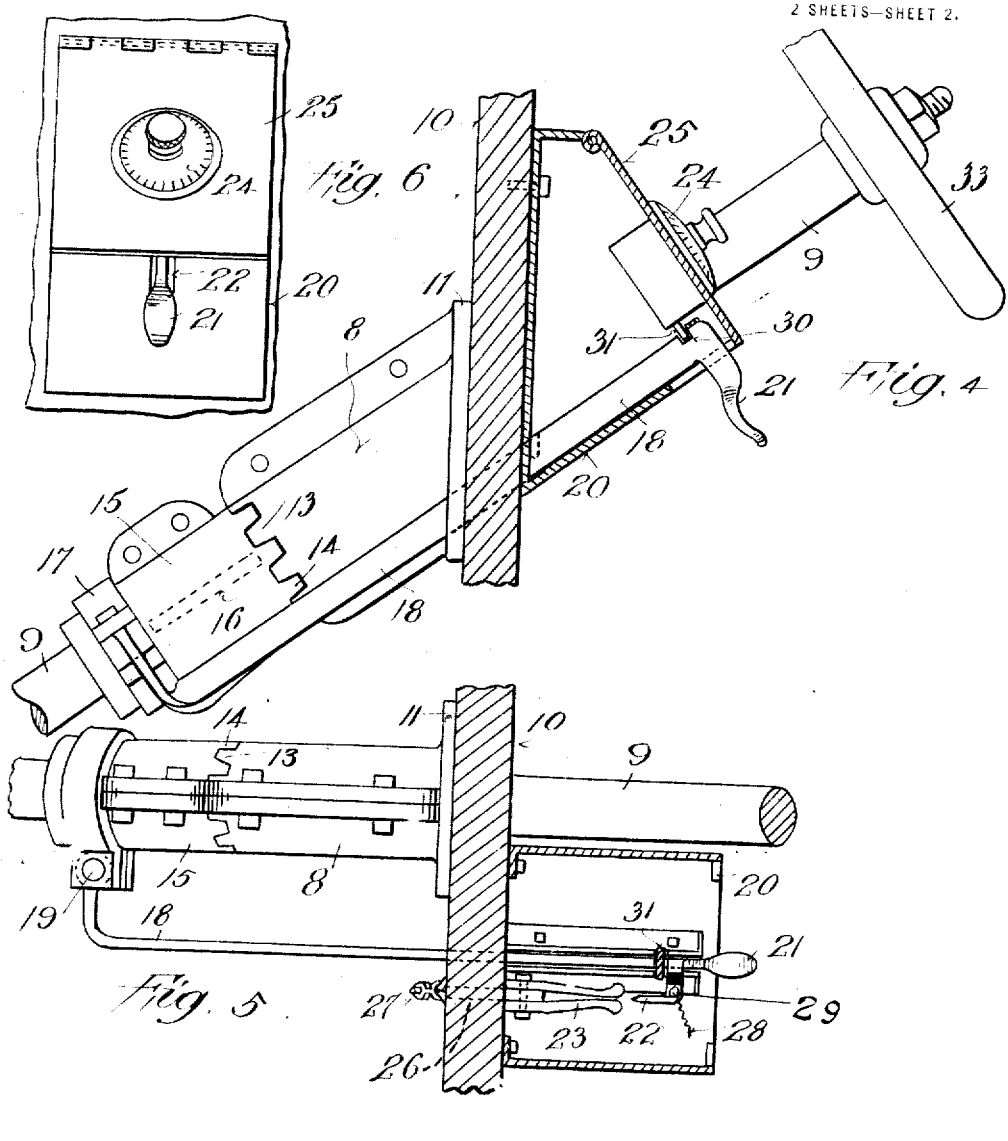
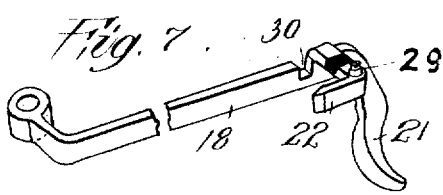
Inventor
Chester L. Randolph
by my atty

UNITED STATES PATENT OFFICE.

CHESTER L. RANDOLPH, OF COSCOB, CONNECTICUT, ASSIGNOR OF ONE-THIRD TO ALBERT EHLERS, OF COSCOB, CONNECTICUT, AND ONE-THIRD TO ROWLAND B. F. RANDOLPH, OF ROSELLE, NEW JERSEY.

MOTOR-CAR-LOCKING DEVICE.

1,341,281.

Specification of Letters Patent. Patented May 25, 1920.

Application filed May 13, 1919. Serial No. 296,800.

*To all whom it may concern:*

Be it known that I, CHESTER L. RANDOLPH, a citizen of the United States, residing at Coscob, in the county of Fairfield and State of Connecticut, have invented new and useful Improvements in Motor-Car-Locking Devices, of which the following is a specification.

My invention relates to motor car locking devices, and its objects are to lock the steering wheels of a motor car, to break the connection of the electric system for sparking and to lock the same against remaking, to operate each of the locking mechanisms simultaneously from the same lever, and to produce a simplified and effective construction.

My invention primarily consists in mounting a clutch upon the steering post of an automobile and operating the same through a lever which may be locked when the clutch is closed, thereby locking the steering mechanism.

My invention further consists in mounting upon the operating lever a knife blade contact arranged to engage with a coöperating contact and to open the sparking circuit when the clutch is closed and the steering mechanism locked.

My invention further consists in the various improvements and novel constructions illustrated in the drawing and more specifically hereinafter pointed out and claimed.

Attention is hereby directed to the accompanying drawing in which similar numerals of designation refer to similar parts throughout the several views.

Figure 1 is a side elevation of my improved device showing the same in its normal position adjacent to the dashboard, and with clutch closed;

Fig. 2 is a diagonal section of the locking chamber shown in Fig. 1, taken in a direction parallel to the steering post;

Fig. 3 is an enlarged view of a portion of Fig. 1, showing a section of the locking chamber on line 3—3 of Fig. 2, looking in the direction of the arrows, and showing the clutch open;

Fig. 4 is an enlarged view similar in character to Fig. 3, showing a section of the locking chamber on line 4—4 of Fig. 2, looking in the direction of the arrows, and showing the clutch closed;

Fig. 5 is a plan view of the clutch and locking chamber and adjacent parts, the wall of such chamber being shown in section or partly removed;

Fig. 6 is an end elevation of the locking chamber, and

Fig. 7 is a view in perspective of the locking lever.

In the drawing, the sleeve 8, mounted upon the steering post 9 of an automobile is secured to the dash-board 10 by means of the flange 11, screws 12 serving for such purpose. The lower end of said sleeve 8 is provided with the teeth 13, which are arranged to mesh with the teeth 14 of the sleeve of the clutch 15, which is likewise mounted upon the steering post 9 and engages with the spline 16 therein, and is thereby held against rotation.

Upon the lower end of the clutch 15 is mounted the collar 17, to which is secured one end of the lever 18 by means of the bolt 19. The upper end of the lever 18 passes through an opening in the dash-board 10 into the locking chamber 20, and is provided with the operating handle 21 extending outside said chamber through the slot 32. The lever 18 has adjacent to said handle 21, the groove 30, which is arranged to engage with the bolt 31 of the combination lock 24 mounted upon the hinged cover 25 of the chamber 20.

For the purpose of breaking the sparking circuit, I provide the lever 18 with the knife contact 22 which is insulated therefrom and is arranged to engage with the coöperating divided contact 23, which is secured to the dash-board 10 and the shank 26 of which extends therethrough and is insulated therefrom. The wire 27 secured as shown to the end of the shank 26, and the wire 28 secured to the binding post 29 serve as a means of incorporating these contacts in the electric circuit operating through the spark plugs.

To lock my device by means of the handle 21, I raise the lever 18, which is normally in the position shown in Fig. 3, to the position shown in Figs. 1, 4 and 5, at which time the clutch 15 will be in engagement with the sleeve 8, and the lever may be locked in position by means of the bolt 31 of the lock 24. At the same instant as will be observed, the knife blade 22 will have broken the connection with the contact 23, and the sparking circuit will be broken. Thus, until the combination lock 24 is unlocked, both the electric circuit and the steering gear will be out of commission.

At such time the sleeve 8 is secured against rotation both by reason of the inclined flange resting against the dashboard 10, and by reason of the screws securing the same thereto. The teeth 14 of the clutch 15 being in close engagement with the teeth 13 of the sleeve 8, the clutch 15 is also held against rotation, and because of its engagement with the spline 16 prevents the turning of the steering post 9. No amount of force capable of being exerted manually upon the wheel 33 will in such case suffice to turn it.

At any time desired the operativeness of the steering mechanism may be quickly restored by the person rightfully in possession of the car upon his unlocking the bolt 31 and pushing the handle 21 back into normal position.

While I have above described the construction and operation of my invention as embodied in the preferred and precise form here shown, I by no means desire so to restrict the scope of my invention, since, as is obvious, various changes and modifications might be made without departing from the spirit of my invention.

What I claim and desire to secure by Letters Patent is:

1. The combination with the dash-board and the steering-post of a motor car, of a pair of sleeve sections surrounding said post on one side of the dash-board and having interengaging teeth, one of said sections being fixed to a stationary part of the car and the other section being slidably keyed to said steering-post, a lock-box secured to the other side of the dash-board and accessible to the operator, a reciprocable shift bar secured to said slidable sleeve and extending through said dash and terminating in said lock-box, a handle for said bar projecting through a slot in the box, whereby the bar may be shifted to engage and disengage said sleeve sections, and a controlled detent within said box to positively prevent movement of the bar, when said sleeve sections are in engagement.

2. A lock attachment for motor cars comprising a pair of sleeve sections to surround the steering-post and having interengaging means thereon, one of said sections being immovably secured to the car and the other section being slidably keyed to said post, a lock controlled detent to be secured to the car at a point remote from the sleeves and accessible to the operator, a reciprocable bar for actuating the slidable sleeve and having an operating handle extending to a point adjacent said detent, whereby the bar may be manually shifted to move said sleeves into or out of interengaging position, and means on the bar engageable by said detent when the sleeves are in interengaging position.

3. A lock attachment for motor cars comprising, in combination a lock-box to be secured to the dash-board of the car and having engageable contacts therein for opening and closing an electrical circuit, interengageable means on the steering-post of the car for locking the latter against rotation, a reciprocable bar in said box and extending substantially parallel with the steering-post, said bar having an operating handle portion projecting through said box and having a connection with said interengaging means and with said contacts, whereby they may be rendered effective and ineffective simultaneously, and a lock mounted on said box and controlling a detent within the box engageable with said bar for positively securing it against movement, when said interengaging means is effective and said contacts disengaged.

4. A lock attachment for motor cars comprising a lock-box to be secured to the dashboard of the car and having a door permitting access to the interior of the box, operative means for locking the steering-post of the car against movement, a shiftable bar connected with said means and extending into the box, said bar having a handle projecting from the box whereby it may be shifted to operate said locking means, and an externally controlled lock mounted on the door of said lock-box and including a detent to lock said bar against movement, and to simultaneously lock said door of the box against opening, when said steering-post locking means is in effective position.

In testimony whereof I have hereunto set my hand in presence of two subscribing witnesses, this 9th day of May, 1919.

CHESTER L. RANDOLPH.

Witnesses:
JOHN P. KRAEBEL,
ARTHUR E. BURKE.